(12) United States Patent
Annadata et al.

(10) Patent No.: US 11,184,397 B2
(45) Date of Patent: Nov. 23, 2021

(54) NETWORK POLICY MIGRATION TO A PUBLIC CLOUD

(71) Applicant: VMWARE, INC., Palo Alto, CA (US)

(72) Inventors: Bhaskar Subramanyam Annadata, Pune (IN); Abhinav Vijay Bhagwat, Pune (IN); Sachin Thakkar, Palo Alto, CA (US); Debashis Basak, Palo Alto, CA (US); Serge Maskalik, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 350 days.

(21) Appl. No.: 16/248,824

(22) Filed: Jan. 16, 2019

(65) Prior Publication Data

US 2020/0059493 A1 Feb. 20, 2020

(30) Foreign Application Priority Data

Aug. 20, 2018 (IN) .............................. 201841031185

(51) Int. Cl.
*H04L 29/06* (2006.01)
*G06F 9/48* (2006.01)
*G06F 9/455* (2018.01)

(52) U.S. Cl.
CPC ............ *H04L 63/20* (2013.01); *G06F 9/4856* (2013.01); *H04L 63/0263* (2013.01); *G06F 9/45545* (2013.01); *G06F 9/45558* (2013.01); *G06F 2009/4557* (2013.01)

(58) Field of Classification Search
CPC .... H04L 63/20; H04L 63/0263; G06F 9/4856
See application file for complete search history.

(56) References Cited

U.S. PATENT DOCUMENTS

| | | | |
|---|---|---|---|
| 2009/0249438 A1* | 10/2009 | Litvin | ................. H04L 63/0263 726/1 |
| 2018/0115470 A1* | 4/2018 | Huang | ................ H04L 41/0873 |
| 2020/0366645 A1* | 11/2020 | Raman | ................ G06F 9/45558 |

* cited by examiner

*Primary Examiner* — Oleg Korsak
(74) *Attorney, Agent, or Firm* — Patterson + Sheridan, LLP

(57) ABSTRACT

An example method of migrating a firewall policy between a first virtual data center and a second virtual data center includes: generating a static firewall from a firewall document at a first firewall server in the first virtual data center, the firewall document defining polices applied to groups of objects in the first virtual data center, the static firewall including firewall rule tuples; sending the static firewall from the first firewall server to a second firewall server in the second virtual data center; migrating a plurality of virtual machines (VMs) from the first virtual data center to the second virtual data center; and importing the firewall document from the first firewall server to the second firewall server by mapping the policies of the first firewall to groups of objects in an inventory of the second virtual data center.

20 Claims, 5 Drawing Sheets

NETWORK POLICY MIGRATION TO A PUBLIC CLOUD

RELATED APPLICATIONS

Benefit is claimed under 35 U.S.C. 119(a)-(d) to Foreign Application Serial No. 201841031185 filed in India entitled "NETWORK POLICY MIGRATION TO A PUBLIC CLOUD", on Aug. 20, 2018, by VMware, Inc., which is herein incorporated in its entirety by reference for all purposes.

BACKGROUND

Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual machines (VMs) and logical networks.

A hybrid cloud system aggregates the resource capability from both private and public clouds. A private cloud can include one or more customer data centers (referred to herein as "private data centers"). The public cloud can include a multi-tenant cloud architecture providing IaaS cloud services.

SUMMARY

One or more embodiments provide techniques for network policy migration to a public cloud. In an embodiment, a method of migrating a firewall policy between a first virtual data center and a second virtual data center includes: generating a static firewall from a firewall document at a first firewall server in the first virtual data center, the firewall document defining polices applied to groups of objects in the first virtual data center, the static firewall including firewall rule tuples; sending the static firewall from the first firewall server to a second firewall server in the second virtual data center; migrating a plurality of virtual machines (VMs) from the first virtual data center to the second virtual data center; and importing the firewall document from the first firewall server to the second firewall server by mapping the policies of the first firewall to groups of objects in an inventory of the second virtual data center.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
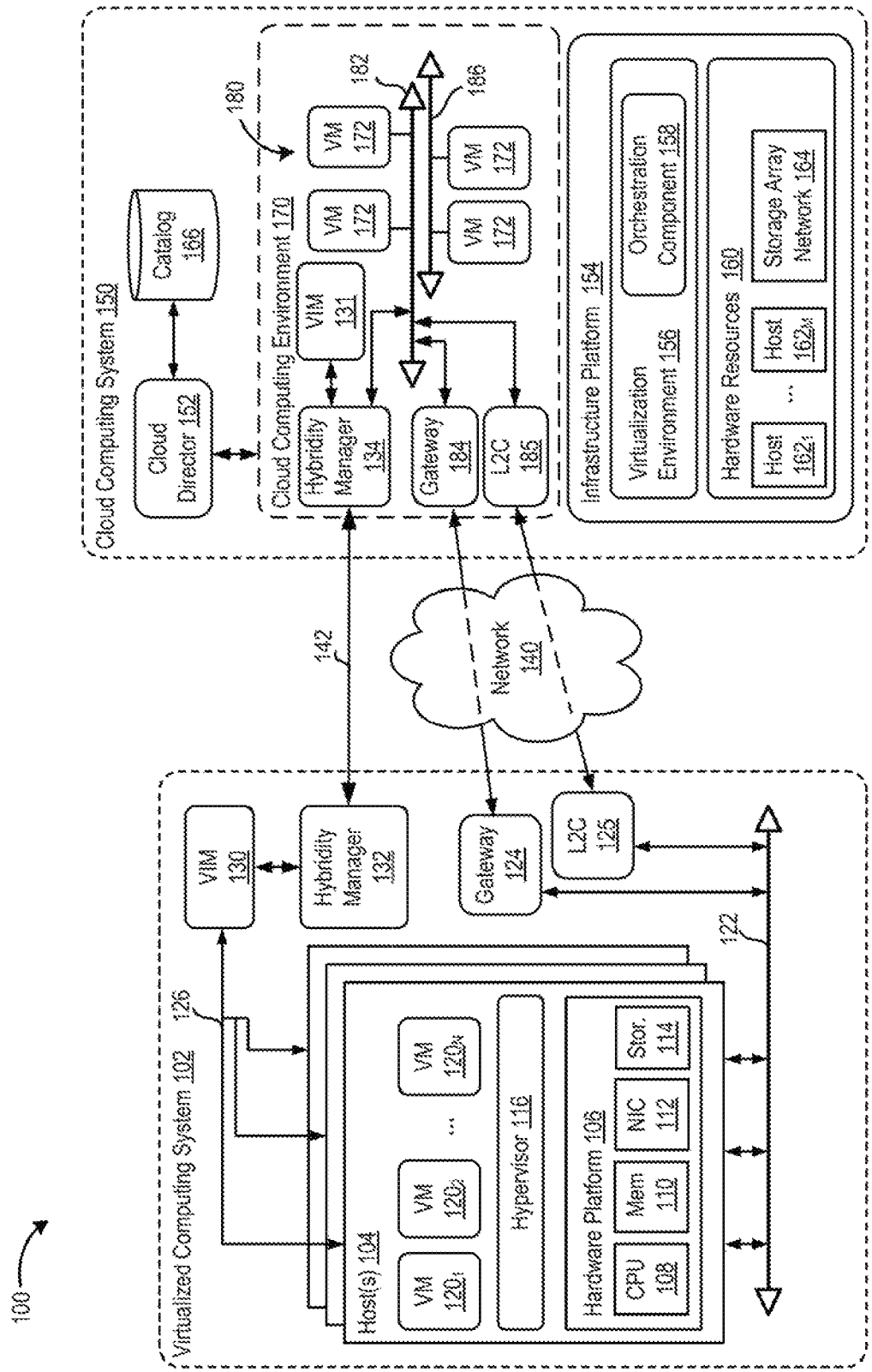
FIG. 1 is a block diagram of a hybrid cloud computing system, according to one embodiment disclosed herein.

FIG. 1 is a block diagram illustrating a hybrid cloud computing system 100 in which one or more embodiments of the present disclosure may be utilized. Hybrid cloud computing system 100 includes a virtualized computing system 102 and a cloud computing system 150. Hybrid cloud computing system 100 is configured to provide a common platform for managing and executing virtual workloads seamlessly between virtualized computing system 102 and cloud computing system 150. Although virtualized computing system 102 and cloud computing system 150 are shown for illustratively purposes, a hybrid cloud computing system may generally include any number of data centers.

In one embodiment, virtualized computing system 102 may be a data center controlled and administrated by a particular enterprise or business organization, while cloud computing system 150 may be operated by a cloud computing service provider and exposed as a service available to account holders, such as the particular enterprise in addition to other enterprises. In such a case, virtualized computing system 102 may be referred to as an on-premise data center(s), and cloud computing system 150 may be referred to as a "public" cloud service. In some embodiments, virtualized computing system 102 may be configured as a private cloud service providing cloud services to various organizations within the enterprise. In other embodiments, virtualized computing system 102 and cloud computing system 150 may both be public clouds.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In a hybrid cloud, a tenant may be provided with seamless access to one or more private cloud resources and/or public cloud resources.

Virtualized computing system 102 includes one or more host computer systems 104. Each of hosts 104 may be constructed on a server grade hardware platform 106, such as an x86 architecture platform. As shown, hardware platform 106 of each host 104 may include conventional components of a computing device, such as one or more processors (CPUs) 108, system memory 110, a network interface 112, storage 114, and other I/O devices such as, for example, a mouse and keyboard (not shown). Processors 108 are configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as networks 122 and 126 within virtualized computing system 102. Network interface 112 may include one or more network adapters, also referred to as network interface cards (NICs). Storage 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi hypervisor provided as part of the VMware vSphere® solution made commercially available from VMware, Inc. Hypervisor 116 may run on top of the operating system of host 104 or directly on hardware components of host 104. In addition, hypervisor 116 may provide a virtual switch (not shown), which is a software-based switch acting as a layer 2 (L2) forwarding engine and capable of performing VLAN tagging, stripping, filtering, L2 security, checksum, segmentation offload units, and other tasks typically performed by physical switches. The virtual switch may include uplink ports which connect to physical network adapters, as well as VM ports which connect to virtual network adapters and provide connections for hypervisor 116 and VMs. In one embodiment, the virtual switch may be part of a distributed virtual switch that is an abstraction of a switch across multiple host servers and that permits virtual switches on the multiple host servers to be managed as if ports of those virtual switches belonged to a single switch, the distributed virtual switch.

Virtualized computing system 102 includes a virtualization management module (depicted in FIG. 1 as virtualized infrastructure manager (VIM) 130) that may communicate with the plurality of hosts 104 via network 126, sometimes referred to as a management network. In one embodiment, VIM 130 is a computer program that resides and executes in a central server, which may reside in virtualized computing system 102, or alternatively, VIM 130 may run as a VM in one of hosts 104. One example of a VIM is the vCenter Server® product made available from VMware, Inc. VIM 130 is configured to carry out administrative tasks for virtualized computing system 102, including managing hosts 104, managing VMs 120 running within each host 104, provisioning VMs, migrating VMs from one host to another host, and load balancing between hosts 104.

As shown, virtualized computing system 102 further includes a hybridity manager 132 that is in communication with VIM 130 and configured to manage and integrate virtualized computing resources provided by cloud computing system 150 with virtualized computing resources of computing system 102 to form a unified "hybrid" computing platform. In one embodiment, hybridity manager 132 is configured to deploy VMs in cloud computing system 150, transfer VMs from virtualized computing system 102 to cloud computing system 150, and perform other "cross-cloud" administrative tasks, as described in greater detail later. Although shown as a separate computer program, which may execute in a central server or run in a VM in one of hosts 104, hybridity manager 132 may alternatively be a module or plug-in complement to VIM 130.

In one or more embodiments, cloud computing system 150 is configured to dynamically provide an enterprise (or users of an enterprise) with one or more virtual data centers 170 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as a multi-tenant cloud service with logically isolated virtualized computing resources on a shared physical infrastructure. It is recognized that cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESX™-based hypervisor technologies provided by VMware, Inc. of Palo Alto, Calif. (although it should be recognized that any other virtualization technologies, including Xen® and Microsoft Hyper-V virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and virtual machine packages that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A virtual machine package is a logical container of one or more pre-configured virtual machines that package applications and parameters that define operational details of the package. An example of a VM package is vApp™ technology made available by VMware, Inc., of Palo Alto, Calif., although other technologies may be utilized. Cloud director 152 receives provisioning requests submitted (e.g., via REST API calls) and may propagates such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual machine) is configured to provide VMs 172 and other components in cloud computing environment 170 with connectivity to an external network 140 (e.g., Internet). Gateway 184 manages external public IP addresses for virtual data center 180 and one or more private internal networks interconnecting VMs 172. Gateway 184 is a WAN facing device providing services such as intelligent routing, traffic steering, WAN optimization, encryption, etc. Gateway 184 may be configured to provide virtual private network (VPN) connectivity over a network 140 with another VPN endpoint, such as a gateway 124 within virtualized computing system 102. In other embodiments, gateway 184 may be configured to connect to and communicate with virtualized computing system 102 using a high-throughput, dedicated link between virtualized computing system 102 and cloud computing system 150. Layer 2 concentrators (L2C) 125 and 185 are parallel to gateways 124 and 184 and configured to provide a "stretched" L2 network that spans virtualized computing system 102 and cloud computing system 150. The stretched network may be separate from the network used by gateways 124 and 184 so that, e.g., VM migration traffic over network used by gateways 124 and 183 does not create latency in stretched network.

As shown, cloud computing system 150 includes a hybridity manager 134 configured to communicate with the corresponding hybridity manager 132 in virtualized computing system 102 to enable a common virtualized computing platform between virtualized computing system 102 and cloud computing system 150. Hybridity manager 134 (e.g., executing as a virtual machine) may communicate with hybridity manager 132 using Internet-based traffic via a VPN tunnel established between gateways 124 and 184, or alternatively, using direct connect 142. In addition, hybridity manager 134 is in communication with a VIM 131, which may perform similar functionalities as VIM 130, described above.

Network Policy Migration in a Federated Hybrid Cloud

Figure 2:
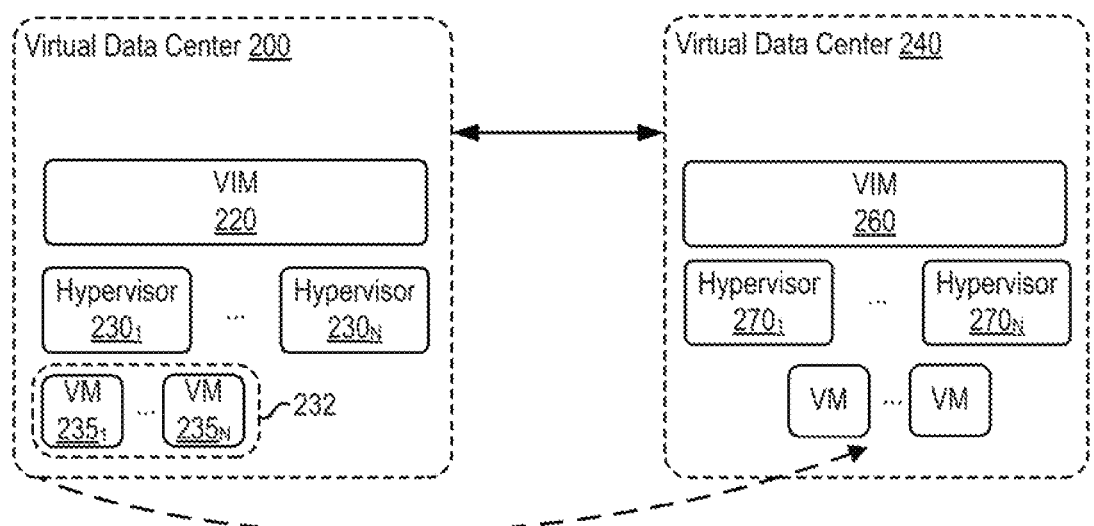
FIG. 2 illustrates an approach for migrating VMs across virtualized infrastructure platforms, according to an embodiment.

FIG. 2 illustrates an approach for migrating VMs across virtualized infrastructure platforms, according to an embodiment. As shown, a VM $235_1$, which is part of an application 232 (e.g., a three-tier application) including multiple VMs $235_{1-N}$ (e.g., a web-facing application VM, a business rules VM, and a database VM in the three-tier application case), is migrated from a virtual data center 200 to a virtual data center 240, thereby stretching application 232 across virtual data centers 200 and 240. Although discussed herein primarily with respect to applications that include multiple VMs, it should be understood that techniques disclosed herein may also be applied to migrate individual VMs that are not part of any application. In addition to the migration of VM $235_1$, a network that VMs $235_{1-N}$ are on may be logically extended across virtual data centers 200 and 240. Each of virtual data centers 200 and 240 includes a pool of infrastructure resources and may be implemented using a system such as virtualized computing system 102 or cloud computing system 150. Virtual data center 200 includes hypervisors $230_1 \ldots 230_N$ to support VMs 235, and virtual data center 240 includes hypervisors $270_1 \ldots 270_N$ to support VMs migrated thereto.

Each virtualized infrastructure platform includes a virtualized infrastructure management layer (shown as virtualized infrastructure managers (VIMs) 220 and 260 for virtual data center 200 and 240, respectively) that is responsible for managing the virtualized infrastructure (of virtual data center 200 and 240). In particular, the virtualized infrastructure management layer manages hosts and may be configured to perform tasks such as managing VMs 120 running within each host, provisioning VMs, migrating VMs from one host to another host, and load balancing between hosts. vCenter Server® and OpenStack® are examples of VIMs.

Virtualization and software defined networking (SDN) allow for enforcing firewalling inside the perimeter of a data center (e.g., on each virtual port of each virtual switch). This is unlike legacy solutions, which only allow firewalling at the perimeter of a data center. Further, in cloud environments, firewall software implements more complex rules than simple five-tuples with source/destination IP and ports. Firewall rules can be written using higher-level constructs that facilitate dynamic and automatic inclusion and exclusion of objects. The firewall software supports a wider variety of objects (e.g., NICs, VMs, compute containers, networks, applications, etc.) and mechanisms (regular expressions, OS type, location, etc.) that security administrators can use to express intent and define firewall policy.

The migration from one data center to another is very complex and time consuming. Typically, such migration takes many months. During the migration phase, applications (e.g., group of VMs) will run across both locations. To keep the applications running without disruption, layer-2 networks are stretch to avoid renumbering of VM NICs (e.g., changing IP addresses). In such scenarios, enforcing the same firewall policy across both locations is not possible.

This is because the firewall software installed in one data center does not have visibility into inventory of objects in the other data center. The translation of dynamic objects into enforceable rules on the other hand is fully dependent on this membership of inventory. Techniques are discussed below to solve the aforementioned problems.

Figure 3:
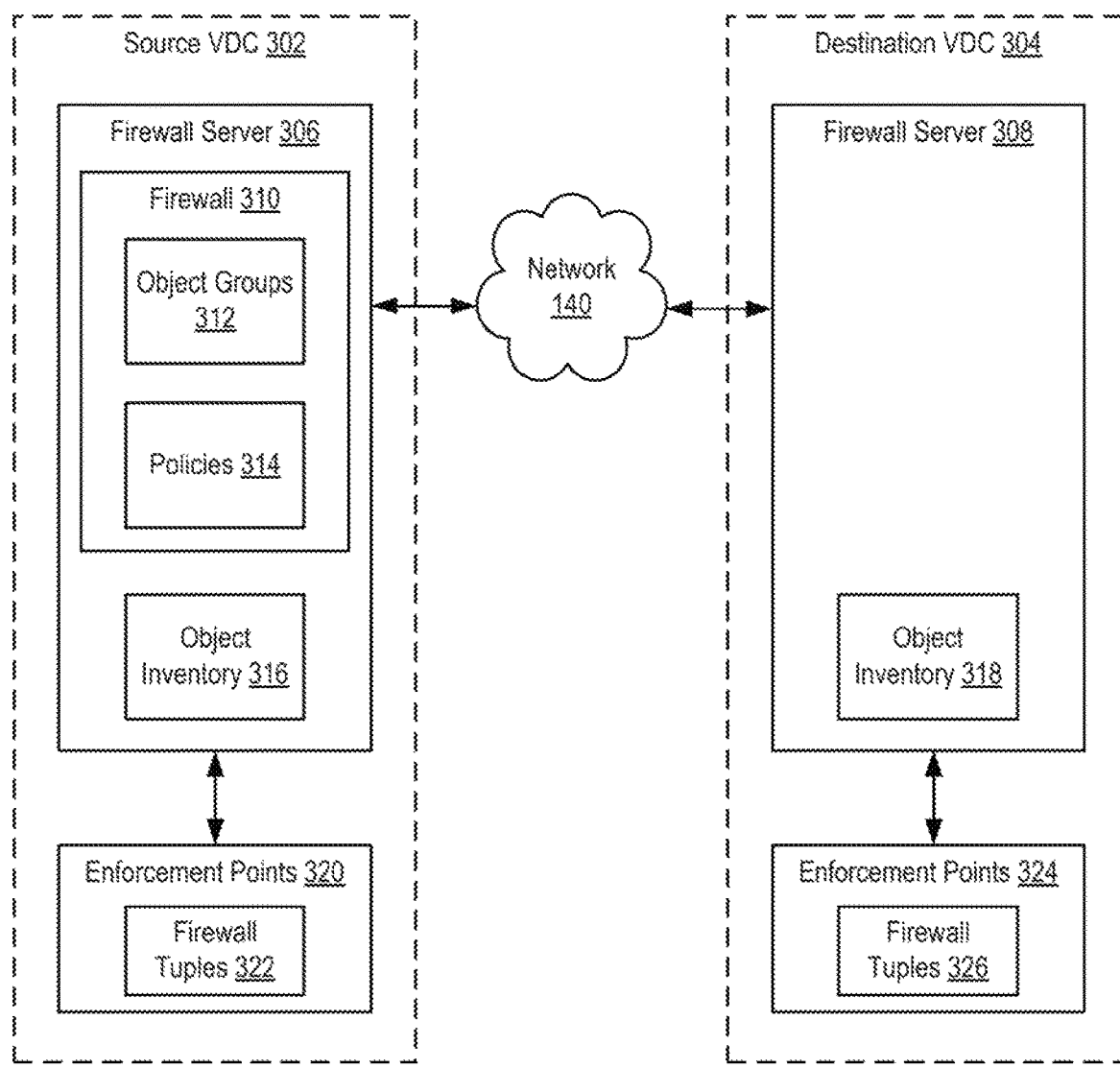
FIG. 3 is a block diagram depicting a computing system according to an embodiment.

FIG. 3 is a block diagram depicting a computing system 300 according to an embodiment. Computing system 300 includes a source virtual data center (VDC) 302 and a destination VDC 304. In an embodiment, source VDC 302 is virtual data center 200 from which VMs 235 are migrated, and destination VDC 304 is virtual data center 240 to which VMs 235 are migrated.

Source VDC 302 includes firewall server 306. Destination VDC 304 includes firewall server 308. Firewall server 306 can be implemented using one or more physical computer systems or one or more VMs. Likewise, firewall server 308 can be implemented using one or more physical computer systems or one or more VMs. Firewall server 306 is in communication with enforcement points 320. Firewall server 308 is in communication with enforcement points 324. Enforcement points 320 and 324 include switches or other appliances, or virtual switches or other virtual appliances, configured to implement firewall services.

Firewall server 306 maintains object inventory 316, and firewall server 308 maintains object inventory 318. Object inventory 316 includes objects in source VDC 302, such as VMs, NICs, compute containers, networks, applications, and the like. Object inventory 318 includes objects in destination VDC 304, such as VMs, NICs, compute containers, networks, applications, and the like. An administrator defines a firewall document ("firewall 310"). Firewall 310 includes object groups 312 and policies 314. Object groups 312 include groups of objects in object inventory 316. Object groups 312 can be dynamic. For example, an object group 312 can include criteria for membership therein. Policies 314 are applied to object groups 312 (e.g., firewall policies, monitoring policies, and the like). Firewall server 310 generates firewall rule tuples ("firewall tuples 322") from firewall 310. A firewall rule tuple is a static rule, such as a 5-tuple (source/destination IP and source/destination port). Firewall server 306 sends firewall tuples 322 to enforcement points 320. Firewall 310 is defined with respect to object inventory 316. Thus, firewall tuples 322 cannot be directly migrated to firewall server 308.

Figure 4:
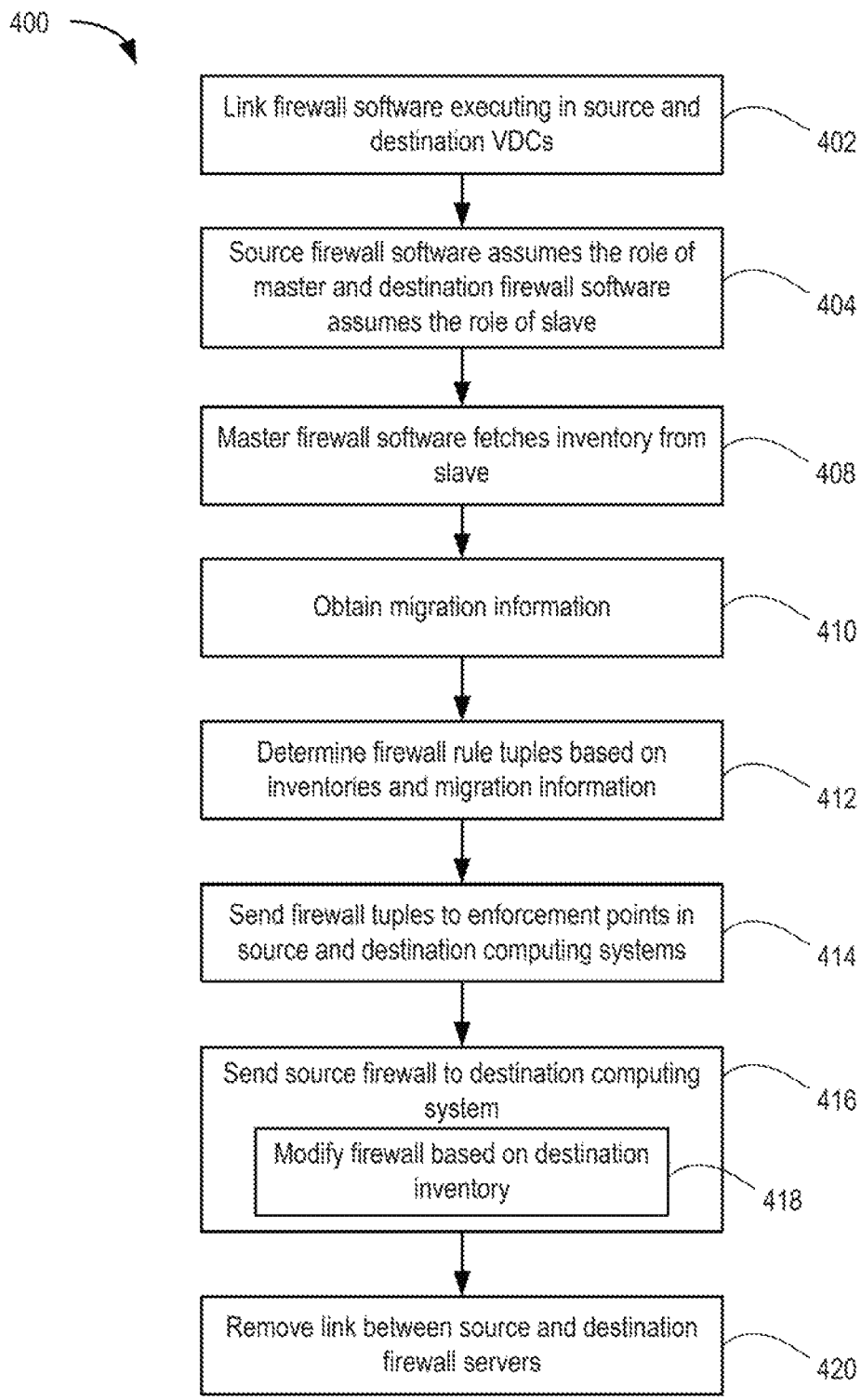
FIG. 4 is a flow diagram depicting a method of network policy migration according to an embodiment.

FIG. 4 is a flow diagram depicting a method 400 of network policy migration according to an embodiment. Method 400 begins at step 402, where an administrator establishes a communication link (e.g., through network 140) between firewall server 306 and firewall server 308 to initiation firewall policy migration. That is, the administrator federates the firewall software running on the source and destination VDCs. At step 404, firewall server 306 in source VDC 302 assumes the role of master and firewall server 308 in destination VDC 304 assumes the role of slave. At step 406, firewall server 306 (acting as master) fetches object inventory 318 from firewall server 308. Firewall server 306 can fetch object inventory 318 periodically during the process to maintain an up-to-date object inventory.

At step 408, firewall server 306 obtains migration information. Migration information can include stateful connections being tracked in the local firewall state for the VMs being migrated. Due to the federation of the firewall software, both the master (firewall server 306) and the slave (firewall server 308) have visibility into those Layer 2 networks stretched and those VMs migrated (referred to herein as migration information). At step 412, firewall server 306 determines firewall rule tuples based on object inventories 316 and 318, as well as the migration information. The migration information is used to translate and share the firewall state information. In particular, firewall server 306 generates firewall tuples 322 as noted above based on firewall 310 and object inventory 316. Firewall server 306 generates firewall tuples 326 based on firewall 310, object inventory 318, and the migration information. That is, firewall server 306 converts the intent and policy of firewall 310 to enforceable rules (e.g., firewall tuples 326) using object inventory 318 and the migration information (e.g., information on stretched layer 2 networks and migrated VMs).

At step 414, firewall server 306 sends firewall tuples to the appropriate enforcement points. That is, firewall server 306 sends firewall tuples 322 to enforcement points 320 and firewall tuples 326 to enforcement points 324. At step 416, the firewall server 306 sends firewall 310 to firewall server 308. If symmetry of object inventories is maintained after the migration, then firewall 310 can be used directly by firewall server 308. If symmetry is not maintained, an administrator can modify firewall 310 to include equivalent objects in object inventory 318 of destination VDC 304 (step 418). At step 420, an administrator removes the communication link between firewall server 306 and the firewall server 308.

Network Policy Migration Across Clouds

In some cases, federating firewall software on source and destination data centers is not an option. This can be due to a variety of reasons, including different security admins owning the two clouds, managed cloud with limited control for tenant security admin, different security products on the two clouds, and the like.

Figure 5:
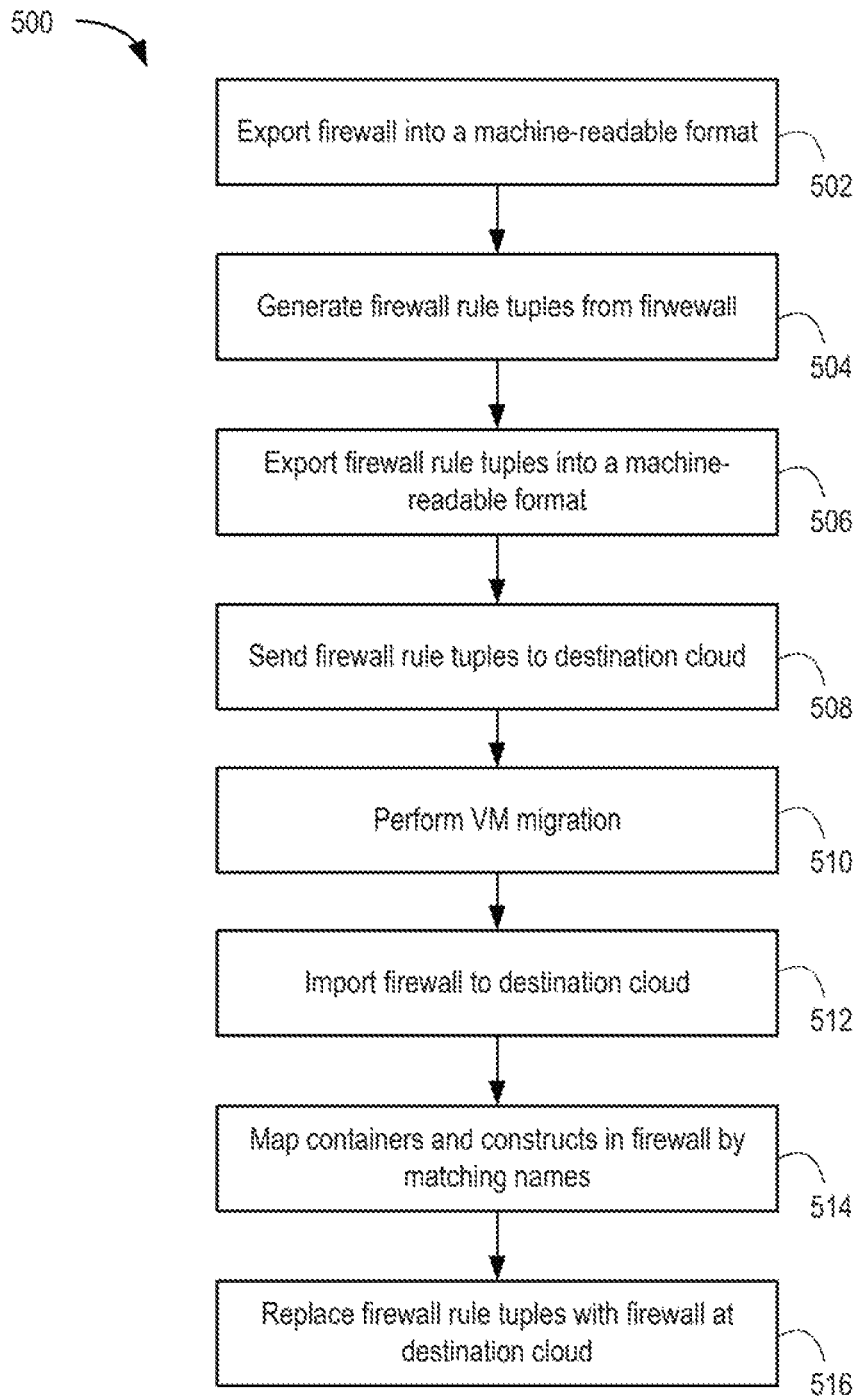
FIG. 5 is a flow diagram depicting a method of network policy migration according to an embodiment.

FIG. 5 is a flow diagram depicting a method 500 of network policy migration according to an embodiment. Method 500 begins at step 502, where firewall server 306 exports firewall 310 into a machine-readable format (e.g., XML, JSON, etc.), which is referred to as the firewall policy document. At step 504, firewall server 306 generates firewall rule tuples from the firewall policy document, which is referred to as a static firewall document. Generation of the static firewall document removes the dynamisms and automatic include/exclusion from the firewall policy document, which are replaced with their static enforceable equivalents.

At step 506, firewall server 306 exports the static firewall document to a machine-readable format (e.g., XML, JSON, etc.). At step 508, firewall server 306 sends the exported static firewall document to firewall server 308 in destination VDC 304. At step 510, migration is performed. As VMs are migrated from one VDC to another, the VMs are protected by the same set of firewall rules. During the period of migration, any changes to firewall 310 are expressed as add/edit of simplified rules in the static firewall document.

At step 512, the firewall policy document is imported to destination VDC 304. During the import, containers and constructs in the firewall policy document are automatically mapped by matching names (step 514). For example, consider a regular expression based rules mapping to all VMs with the name "Dev-Test*". This would translate to the local inventory, as opposed to the remote inventory. Similarly, there may be security groups or mapping containers with the same names on each side (although the groups/containers include different objects). Thus, these containers and groups are mapped from the local (source) inventory to the remote (destination) inventory.

In an embodiment, migration information is leveraged while performing the mapping. In an embodiment, an administrator can provide manual mappings as needed. At step 516, the static firewall document is replaced with an updated firewall policy document on destination VDC 304.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of migrating a firewall policy between a first virtual data center and a second virtual data center, comprising:

generating a static firewall from a firewall document at a first firewall server in the first virtual data center, the firewall document defining a plurality of policies dynamically applied to one or more objects of a plurality of objects in the first virtual data center according to a membership of each of the one of more objects to a corresponding policy, wherein generating the static firewall comprises removing the dynamic applicability of the plurality of policies to each of the one of more objects according to a corresponding membership, the static firewall including firewall rule tuples, wherein:
the first virtual data center comprises:
a first plurality of host machines;
a first plurality of virtual machines (VMs) running on the first plurality of host machines;
a first gateway configured to provide the first plurality of VMs with connectivity to an external network outside of the first virtual data center; and
a first virtualized infrastructure manager for the first virtual data center; and
the second virtual data center comprises:
a second plurality of host machines;
a second plurality of VMs running on the second plurality of host machines;
a second gateway configured to provide the second plurality of VMs with connectivity to the external network outside of the second virtual data center; and
a second virtualized infrastructure manager for the second virtual data center;
sending the static firewall from the first firewall server to a second firewall server in the second virtual data center;
migrating one or more VMs from the first virtual data center to the second virtual data center;
importing the firewall document from the first firewall server to the second firewall server by mapping the policies defined by the firewall document to groups of objects in an inventory of the second virtual data center; and
replacing the static firewall with the imported firewall document at the second firewall server, the imported firewall document defining the plurality of policies dynamically applied to the groups of objects in the inventory of the second virtual data center.

2. The method of claim 1, wherein the step of generating the static firewall comprises exporting the firewall document into a machine-readable format.

3. The method of claim 2, wherein the step of sending the static firewall comprises exporting the static firewall into the machine-readable format.

4. The method of claim 1, further comprising:
receiving a change to the firewall document; and
modifying the static firewall by adding, editing, or removing one or more firewall rule tuples in response to the change.

5. The method of claim 1, further comprising obtaining migration information at the first firewall server from the second firewall server, wherein the policies defined by the firewall document are mapped to the groups of objects in the inventory of the second virtual data center based on the migration information.

6. The method of claim 1, further comprising:
receiving a manual mapping from an administrator; and
adding the manual mapping when importing the firewall document from the first firewall server to the second firewall server.

7. The method of claim 1, wherein mapping the policies defined by the firewall document to groups of objects in the inventory of the second virtual data center further comprises mapping a name of a container to a name in the first firewall document.

8. The method of claim 7, wherein the container is a logical container of one or more pre-configured virtual machines that package applications and parameters that define operational details of the package.

9. A non-transitory computer-readable medium comprising instructions, which when executed in a computer system, causes the computer system to carry out a method of migrating a firewall policy between a first virtual data center and a second virtual data center, comprising:
generating a static firewall from a firewall document at a first firewall server in the first virtual data center, the firewall document defining a plurality of policies dynamically applied to one or more objects of a plurality of objects in the first virtual data center according to a membership of each of the one or more objects to a corresponding policy, wherein generating the static firewall comprises removing the dynamic applicability of the plurality of policies to each of the one of more objects according to a corresponding membership, the static firewall including firewall rule tuples, wherein:
the first virtual data center comprises:
a first plurality of host machines;
a first plurality of virtual machines (VMs) running on the first plurality of host machines;
a first gateway configured to provide the first plurality of VMs with connectivity to an external network outside of the first virtual data center; and
a first virtualized infrastructure manager for the first virtual data center; and
the second virtual data center comprises:
a second plurality of host machines;
a second plurality of VMs running on the second plurality of host machines;
a second gateway configured to provide the second plurality of VMs with connectivity to the external network outside of the second virtual data center; and
a second virtualized infrastructure manager for the second virtual data center;
sending the static firewall from the first firewall server to a second firewall server in the second virtual data center;
migrating one or more VMs from the first virtual data center to the second virtual data center;
importing the firewall document from the first firewall server to the second firewall server by mapping the policies defined by the firewall document to groups of objects in an inventory of the second virtual data center; and
replacing the static firewall with the imported firewall document at the second firewall server, the imported firewall document defining the plurality of policies dynamically applied to the groups of objects in the inventory of the second virtual data center.

10. The non-transitory computer-readable medium of claim 9, wherein the step of generating the static firewall comprises exporting the firewall document into a machine-readable format.

11. The non-transitory computer-readable medium of claim 10, wherein the step of sending the static firewall comprises exporting the static firewall into the machine-readable format.

12. The non-transitory computer-readable medium of claim 9, further comprising:
receiving a change to the firewall document; and modifying the static firewall by adding, editing, or removing one or more firewall rule tuples in response to the change.

13. The non-transitory computer-readable medium of claim 9, further comprising obtaining migration information at the first firewall server from the second firewall server, wherein the policies defined by the firewall document are mapped to the groups of objects in the inventory of the second virtual data center based on the migration information.

14. The non-transitory computer-readable medium of claim 9, further comprising:
receiving a manual mapping from an administrator; and
adding the manual mapping when importing the firewall document from the first firewall server to the second firewall server.

15. A computing system, comprising:
a first virtual data center comprising:
a first plurality of host machines;
a first plurality of virtual machines (VMs) running on the first plurality of host machines;
a first gateway configured to provide the first plurality of VMs with connectivity to an external network outside of the first virtual data center; and
a first virtualized infrastructure manager for the first virtual data center;
a second virtual data center comprising:
a second plurality of host machines;
a second plurality of VMs running on the second plurality of host machines, wherein one or more of the second plurality of VMs were migrated from the first data center;
a second gateway configured to provide the second plurality of VMs with connectivity to the external network outside of the second virtual data center; and
a second virtualized infrastructure manager for the second virtual data center;
wherein a first firewall server in the first virtual data center is configured to generate a static firewall from a firewall document, the firewall document defining a plurality of policies dynamically applied to one or more objects of a plurality of objects in the first virtual data center according to a membership of each of the one of more objects to a corresponding policy, wherein generating the static firewall comprises removing the dynamic applicability of the plurality of policies to each of the one of more objects according to a corresponding membership, the static firewall including firewall rule tuples;
wherein the first firewall server is configured to send the static firewall to a second firewall server in the second virtual data center;
wherein the second firewall server is configured to import the firewall document from the first firewall server by mapping the policies defined by the firewall document to groups of objects in an inventory of the second virtual data center; and
wherein the second firewall server is configured to replace the static firewall with the imported firewall document, the imported firewall document defining the plurality of policies dynamically applied to the groups of objects in the inventory of the second virtual data center.

16. The computing system of claim 15, wherein the first firewall server is configured to generate the static firewall by exporting the firewall document into a machine-readable format.

17. The computing system of claim 16, wherein the first firewall server is configured to send the static firewall by exporting the static firewall into the machine-readable format.

18. The computing system of claim 15, wherein the first firewall server is configured to:
receive a change to the firewall document; and
modify the static firewall by adding, editing, or removing one or more firewall rule tuples in response to the change.

19. The computing system of claim 15, wherein the first firewall server is configured to obtain migration information from the second firewall server, wherein the policies defined by the firewall document are mapped to the groups of objects in the inventory of the second virtual data center based on the migration information.

20. The computing system of claim 15, wherein the first firewall server is configured to:
receive a manual mapping from an administrator; and
add the manual mapping when importing the firewall document from the first firewall server to the second firewall server.

* * * * *